United States Patent Office 3,661,983
Patented May 9, 1972

3,661,983
DITHIOCARBONYLHYDRAZIDIC ACID AND DERIVATIVES AND THE METHOD OF MAKING SAME
Lawrence H. Nash, P.O. Box 596,
Belle Glade, Fla. 33430
No Drawing. Filed Nov. 26, 1968, Ser. No. 779,252
Int. Cl. C07c 155/04, 155/06, 155/10
U.S. Cl. 260—513.5          9 Claims

ABSTRACT OF THE DISCLOSURE

The compounds are the reaction of and derivatives of hydrazine and carbon bisulphide, reacted on a molecular basis. A representative compound of the invention being, the "sodium N,N-dichloro-N-dithiocarbonylhydrazide." The compounds can be employed as insecticides, fungicides, bactericides, microbicides, etc. for the control of pathogens on humans, animals and plants.

This invention relates to new and improved insecticides, fungicides, bactericides and microbicides for control of pathogens on humans, animals and plants when used as a liquid, powder, emulsion, suspension or an admixture with other insecticides, fungicides, bactericides and microbicides commonly used in the art for control of pathogens on humans, animals and plants.

It is known within the art that dithiocarbamates formed from the reaction of ethylenediamine and carbon bisulphide are explosive. This is also true of the reaction of hydrazine and carbon bisulphide. The reaction as taught in this invention is to add the hydrazine to an alcohol, or water, externally cool the solution below room temperature, maintain this temperature while adding the carbon bisulphide which forms a white crystalline compound that is insoluble in water, alcohol or hydrocarbon solvents. The derivatives of this acid will be disclosed hereinafter.

EXAMPLE 1

A mole of hydrazine hydrate is added to 2,000 ml. of methanol and the temperature reduced to 10 degrees centigrade, a mole of carbon bisulphide is added, keeping the temperature of the reaction below 20 degrees centigrade. The reaction efficiency is essentially theoretical, having formed dithiocarbonylhydrazidic acid. Naming this acid as a semicarbazide would not properly described the compound whose structure is, HHNNHCSSH.

EXAMPLE 2

The alcohol containing the dithiocarbonylhydrazidic acid is treated with a mole of sodium hydroxide which causes an amber colored fluid to form, is sodium dithiocarbonylhydrazide, having a structure of HHNNHCSSNa

EXAMPLE 3

Two moles of composition from Example 2 are treated with an aqueous solution of manganese sulphate, stirring briskly for ten minutes forming a light brown precipitate which is filtered and dried in a forced draft oven at 90 degrees centigrade, forming manganous bis dithiocarbonylhydrazide, having a structure of HHNNHCSSMnSCSNHNHH Two percent hexamethylene tetramine is added before drying, as a flame retardant and preservative.

Although this example shows the drying of the material in a forced draft oven, other methods are available for drying, such as drum drying, drying with reduced heat and pressure and drying towers. The method of drying will be determined by the volume to be dried.

EXAMPLE 4

Two moles of composition from Example 2 are treated with an aqueous solution of one half mole of manganese sulphate and one half mole of zinc sulphate, stirring briskly for ten minutes, forming the intimately mixed heavy metal salts of zinc manganous bis dithiocarbonylhydrazide, having a structure of HHNNHCSSZn·MnSCSNHMHH which is dried in a forced draft oven at 90 degrees centigrade. This mixed salt is more intimately mixed than would be possible to mix the individual sales mechanically. Two percent hexamethylene tetramine is added before drying, as a flame retardant and preservative.

EXAMPLE 5

Two moles of composition from Example 2 are treated with two moles of hydrogen peroxide which forms an alcohol insoluble, water soluble precipitate, tetrathio bis carbonylhydrazide, having a structure of

HHNNHCSSSCSNHNHH which is recovered by filtration and drying at 90 degrees centigrade in a forced draft oven.

EXAMPLE 6

Two moles of composition from Example 2 are treated with oxygen under pressure while the temperature is maintained below room temperature. The trithio bis carbonylhydrazide, precipitates and is recovered by filtration and dried in a forced draft oven at 90 degrees centigrade. It has a structure of HHNNHCSSCSNHNHH.

EXAMPLE 7

One mole of composition from Example 2 is treated with two moles of sodium hypochlorite, precipitating the sodium N,N-dichlorodithiocarbonylhydrazide which is insoluble in alcohol and soluble in water, having a structure of ClNClNHCSSNa.

EXAMPLE 8

One mole of composition from Example 2 is treated with one mole of sodium hypochlorite, forming the disodium salt of N-chlorodithiocarbonylhydrazide and having a structure of $(ClNNHCSSNa)^{Na+}$

EXAMPLE 9

One mole of composition from Example 7 is treated with a mole of methylmagnesiumchloride forming the sodium N-chloromethyldithiocarbonylhydrazide, having a structure of ClCH$_2$NHCSSNA.

EXAMPLE 10

It should be noted that the above reactions follow the art in forming chloroamines by reacting the amine with sodium or potassium hypochlorite, as well as replacing the chlorine with an alkyl group by use of Grignard reagents. Since aliphatic amines are slightly stronger bases than ammonia, they form salts with the acids of this invention in aqueous solution and are part of this invention.

One mole of composition from Example 1 is treated with a mole of dimethylamine forming a dimethylamine solution of dithiocarbonylhydrazidic acid.

EXAMPLE 11

Two moles of composition from Example 7 are treated with two moles of hydrogen peroxide forming N,N,N',N'-tetrachlorotetrathio bis carbonylhydrazide, having a structure of ClNClNHCSSSCSNHNClCl.

EXAMPLE 12

Two moles of composition from Example 7 are treated with oxygen under pressure, maintaining a temperature below room temperature, forming N,N,N',N'-tetrachlorotrithio bis carbonylhydrazide, having a structure of ClNClNHCSSCSNHNClCl.

EXAMPLE 13

Two moles of composition from Example 7 is added to an aqueous solution of one half mole of manganese sulphate and one half mole of zinc sulphate with brisk agitation. Stirring is continued until the reactants are smooth. The precipitate is filtered to which is added four gms. of hexamethylene tetramine, then dried in a forced draft oven at 90 degrees centigrade, forming zinc manganous bis N,N-dichlorodithiocarbonylhydrazide, having a structure of $ClNClNHCSSZn \cdot MnSCSNHN(Cl)_2$.

EXAMPLE 14

A continuous process for the formation of the compounds of this invention is shown, knowing that those skilled in the art may vary the process and still arrive at the same end point. Twenty gallons of methanol is added to a reactor followed by seven pounds, twelve ounces of carbon bisulphide and three and one half pounds of anhydrous hydrazine. As the hydrazine is added, the ingredients are circulated and externally cooled to a temperature less than room temperature, (about fifteen degrees centigrade). When the hydrazine has been added an alcoholic solution of four pounds of sodium hydroxide dissolved in methanol is added, followed by fifteen pounds of a 10% sodium hypochlorite solution. Circulation is continued for thirty minutes and the sodium N,N-dichlorodithiocarbonylhydrazide is recovered by filtration and suction. The alcohol is reclaimed by distillation, the sodium hydroxide is recovered and used in situ. The small amount of sodium N,N-dichlorodithiocarbonylhydrazide in the final drying is recovered when the sodium hydroxide is used in situ.

EXAMPLE 15

A continuous process for the formation of N,N,N',N'-tetrachlorotetrathio bis carbonlhydrazide is apparent from Example 14. After the addition of the sodium hydroxide as shown in Example 14, four moles of hydrogen peroxide are added and the circulation continued for thirty minutes when the N,N,N',N'-tetrachlorotetrathio bis carbonlhydrazide is recovered by filtration and the filtrate treated as shown above.

EXAMPLE 16

A continuous process for the formation of the heavy metal salts of bis dithiocarbonylhydrazide as shown in Example 3. When a large volume is processed, a drying tower is used, and the metal bis dithiocarbonylhydrazide will have more water in the slurry so that it can be pumped into the drying tower.

The alkali hydroxides that may be used in this invention are sodium, potassium, ammonium and lithium hydroxides, used alone or in combination.

The mono and dialkyl amines that may be used in this invention have from one to six carbon atoms in the chain.

The water soluble divalent metal salts are chosen from zinc, manganese, copper, iron, cobalt, nickel, cadmium, mercury and lead.

Both sodium hypochlorite and potassium hypochlorite may be used in this invention. Sodium being preferred because of yield and activity.

The alcohols that may be used in this invention are similar to those shown in my United States Pat. No. 2,900,293 dated Aug. 18, 1958.

Stabilization of the compounds of this invention by sodium sulphide, methyl cellulose, hexamethylene tetramine, paraformaldehyde, clays and xanthates are easily added by those skilled in the art.

Some formulations of the products of this invention are:

LIQUID 108.17 gms. of the composition from Example 1 is added to 112.7 gms. of 40% dimethylamine in 522.08 gms. of water. Stirring is continued for two hours when 7.7 gms. of alkyl aryl sulfonate, and 7.7 gms. of methyl cellulose and 7.7 gms. of sodium sulphide are added. Stirring is continued until the solution is clear, forming a 20% active dimethylamine solution of dithiocarbonylhydrazidic acid.

SUSPENSION 82 gms. of manganous bis N,N-dichlorodithiocarbonylhydrazide from Example 2, one percent alkyl aryl sulfonate, one percent methyl cellulose, one percent paraformaldehyde and 16 percent clay are mixed thoroughly and milled to a fine powder. Two pounds of this powder is added to ten gallons of agricultural oil used for spraying bananas, for control of sigatoka and crown rot.

EMULSION

Five pounds of sodium N,N-dichlorodithiocarbonylhydrazide is added to 50 gallons of water base concrete paint to suppress the development of fungus after the paint dries.

SOLUTION

Ten gms. of sodium N,N-dichlorodithiocarbonylhydrazide is added to 90 gms. of glycerine and heated gently until in solution. This solution controls athlete's feet without the discomfort of burning or destruction of flesh. This solution is also excellent for control of impetigo, red bug bites and various skin rashes.

POWDER 80 pounds of manganous bis dithiocarbonylhydrazide, 2 pounds of hexamethyl tetramine, one pound of methyl cellulose, one pound of alkyl aryl sulfonate and 16 pounds of clay are mixed and milled to a fine powder. This product is used at the rate of three pounds of the finished powder to 100 gallons of water, sprayed on an acre of tomatoes on a weekly schedule for control of early and late blight.

POWDER

A powder consisting of 80 pounds N,N,N',N'-tetrachlorotetrathio bis carbonylhydrazide, 2 pounds of hexamethylene tetramine, one pound methyl cellulose, one pound alkyl aryl sulfonate and 16 pounds of clay are mixed and milled to a fine powder. One pound of the finished powder treats 100 pounds of celery seed, which are coated with the powder by tumbling slowly.

LIQUID

Two pounds of sodium N,N-dichlorodithiocarbonylhydrazide, 2 ounces of sodium sulphide, one ounce of alkyl naphthalene sodium sulfonate in sufficient water to make one gallon of solution. Two quarts of this solution mixed into 100 gallons of water and sprayed on citrus in two applications two weeks apart gives excellent control of rust mites.

ADMIXTURE

Two quarts of sodium N,N-dichlorodithiocarbonylhydrazide as compounded just above plus one pound of wettable toxaphene to 100 gallons of water gives excellent control of corn ear worms and helminthosporium leaf blight on sweet corn in Florida.

I claim:

1. A compound of the group consisting of (1) alkali salt of N,N-dichlorodithiocarbonylhydrazide, of the formula ClNClNHCSSR wherein R is ammonium or an alkali metal, and (2) dialkali metal salt of N-chlorodithiocarbonylhydrazide.

2. The compound of claim 1 wherein said alkali salt of N,N-dichlorodithiocarbonylhydrazide is alkali metal salt of N,N-dichlorodithiocarbonylhydrazide.

3. The compound of claim 2 wherein said alkali metal salt of N,N-dichlorodithiocarbonylhydrazide is sodium N,N-dichlorodithiocarbonylhydrazide of the structural formula ClNClNHCSSNa.

4. A compound according to claim 1 wherein said compound is a dialkyl metal salt of N,N-dichlorodithiocarbonylhydrazide.

5. The compound of claim 4 wherein said dialkali metal salt of N,N-dichlorodithiocarbonylhydrazide is disodium salt of N-chlorodithiocarbonylhydrazide of the structure (ClNNHCSSNa)$^{Na+}$.

6. A process of preparing an alkali salt of N,N-dichlorodithiocarbonylhydrazide of the formula ClNClNHCSSX wherein X is ammonium, sodium, potassium or lithium, said process comprising the steps of introducing an alkali dithiocarbonylhydrazide of the formula

HHNNHCSSX wherein X is ammonium, sodium, potassium or lithium, into an alcohol solution; and thereafter introducing two moles of an alkali metal hypochlorite into said alcohol solution resulting in the formation of said alkali salt of N,N-dichlorodithiocarbonylhydrazide which is alcohol insoluble.

7. A process according to claim 6, wherein said alkali metal hypochlorite is selected from the group consisting of sodium and potassium hypochlorite.

8. A process of preparing a dialkali salt of N-chlorodithiocarbonylhydrazide which comprises the steps of introducing one mole of an alkali dithiocarbonylhydrazide of the formula HHNNHCSSX wherein X is ammonium, sodium, potassium or lithium, into an alcohol solution; and thereafter introducing one mole of an alkali metal hypochlorite into said alcohol solution resulting in the formation of said dialkali salt of N-chlorodithiocarbonylhydrazide.

9. A process according to claim 8, wherein said alkali metal hypochlorite is selected from the group consisting of sodium and potassium hypochlorite.

References Cited

FOREIGN PATENTS 963,924   7/1964   Great Britain.

OTHER REFERENCES

Losanitch, Chemical Society Journal, vol. 119, pp. 763–5 (1921).

Kul'berg et al., Chemical Abstracts, vol. 49, p. 11,559g (1955).

JOSEPH REBOLD, Primary Examiner

R. L. RAYMOND, Assistant Examiner

U.S. Cl. X.R.

260—429 R, 429.9, 431, 435 R, 438.1, 439 R, 501.21, 545 R, 567; 424—286, 328

UNITED STATES PATENT OFFICE
CERTIFICATE OF CORRECTION

Patent No. 3,661,983　　　　　　　　　　Dated May 9, 1972

Inventor(s) Lawrence H. Nash

It is certified that error appears in the above-identified patent and that said Letters Patent are hereby corrected as shown below:

Column 2, line 14, the word "sales" should read --salts--.

Column 2, line 54, the formula reading "ClCH$_2$NHCSSNA" should read

--ClN(CH$_2$)NHCSSNa-- .

Signed and sealed this 14th day of November 1972.

(SEAL)
Attest:

EDWARD M. FLETCHER, JR.　　　　　　　　ROBERT GOTTSCHALK
Attesting Officer　　　　　　　　　　　　Commissioner of Patents